United States Patent [19]
Carlson et al.

[11] Patent Number: 6,120,685
[45] Date of Patent: Sep. 19, 2000

[54] WATER FILTERING SYSTEM WITH REPLACEABLE CARTRIDGE FOR A REFRIGERATOR

[75] Inventors: David A. Carlson; Kurt Charles Senner, both of Galesburg, Ill.

[73] Assignee: Maytag Corporation, Newton, Iowa

[21] Appl. No.: 09/258,356

[22] Filed: Feb. 26, 1999

[51] Int. Cl.[7] .................................................. B01D 27/00
[52] U.S. Cl. ........................ 210/232; 210/236; 210/444; 210/DIG. 17; 62/339; 222/189.06
[58] Field of Search .................................... 210/232, 443, 210/444, DIG. 17, 236; 62/338, 339, 389; 222/189.06, 189.11

[56] References Cited

U.S. PATENT DOCUMENTS

| | | |
|---|---|---|
| 2,315,603 | 4/1943 | Duncan . |
| 2,623,367 | 12/1952 | Morrison . |
| 3,035,418 | 5/1962 | Wright . |
| 3,358,839 | 12/1967 | Simons . |
| 3,502,221 | 3/1970 | Butterfield . |
| 3,746,171 | 7/1973 | Thomsen . |
| 3,982,406 | 9/1976 | Hanson et al. . |
| 4,102,473 | 7/1978 | Draxler . |
| 4,207,994 | 6/1980 | Offlee, Sr. . |
| 4,255,937 | 3/1981 | Ehrlich . |
| 4,502,956 | 3/1985 | Wilson et al. . |
| 4,556,484 | 12/1985 | Hunter et al. . |
| 4,571,953 | 2/1986 | Caruso . |
| 4,615,799 | 10/1986 | Mortensen . |
| 4,626,350 | 12/1986 | Reid . |
| 4,637,874 | 1/1987 | Ansteth . |
| 4,735,716 | 4/1988 | Petrucci et al. . |
| 4,830,223 | 5/1989 | Priest . |
| 4,866,949 | 9/1989 | Rudick . |
| 4,877,521 | 10/1989 | Petrucci et al. . |
| 4,915,831 | 4/1990 | Taylor . |
| 5,064,097 | 11/1991 | Brog et al. . |
| 5,083,442 | 1/1992 | Vlock . |
| 5,112,477 | 5/1992 | Hamlin . |
| 5,135,645 | 8/1992 | Sklenak et al. . |
| 5,143,575 | 9/1992 | Glassel et al. . |
| 5,154,823 | 10/1992 | Ma et al. . |
| 5,320,752 | 6/1994 | Clack et al. . |
| 5,336,406 | 8/1994 | Stanford et al. . |
| 5,354,464 | 10/1994 | Slovak et al. . |
| 5,484,538 | 1/1996 | Woodward . |
| 5,490,547 | 2/1996 | Abadi et al. . |
| 5,502,978 | 4/1996 | Field . |
| 5,707,518 | 1/1998 | Coates et al. . |
| 5,715,699 | 2/1998 | Coates et al. . |
| 5,768,905 | 6/1998 | Oh . |
| 5,826,854 | 10/1998 | Janvrin et al. . |
| 5,907,958 | 6/1999 | Coates et al. . |

*Primary Examiner*—David A. Simmons
*Assistant Examiner*—Fred Prince
*Attorney, Agent, or Firm*—Everett G. Diederiks, Jr.

[57] ABSTRACT

A water filtering system for a refrigerator includes a mounting head preferably arranged under a temperature control housing in a fresh food compartment. A replaceable filter cartridge is adapted to be selectively attached to the mounting head in order to complete a fluid circuit from a water supply source to at least one of a water dispenser and an ice maker. The filter cartridge and the mounting head have cooperating camming structure which axially draws a stem portion of the cartridge into a port of the mounting head upon rotation of the cartridge relative to the mounting head during installation of the cartridge. Furthermore, camming structure is also provided to at least partially, axially withdraw the stem portion from the port upon rotation of the cartridge a predetermined amount in an opposing direction. Also provided as part of the water filtering system is a plug which can be used to complete the fluid circuit in the absence of a filter cartridge.

20 Claims, 4 Drawing Sheets

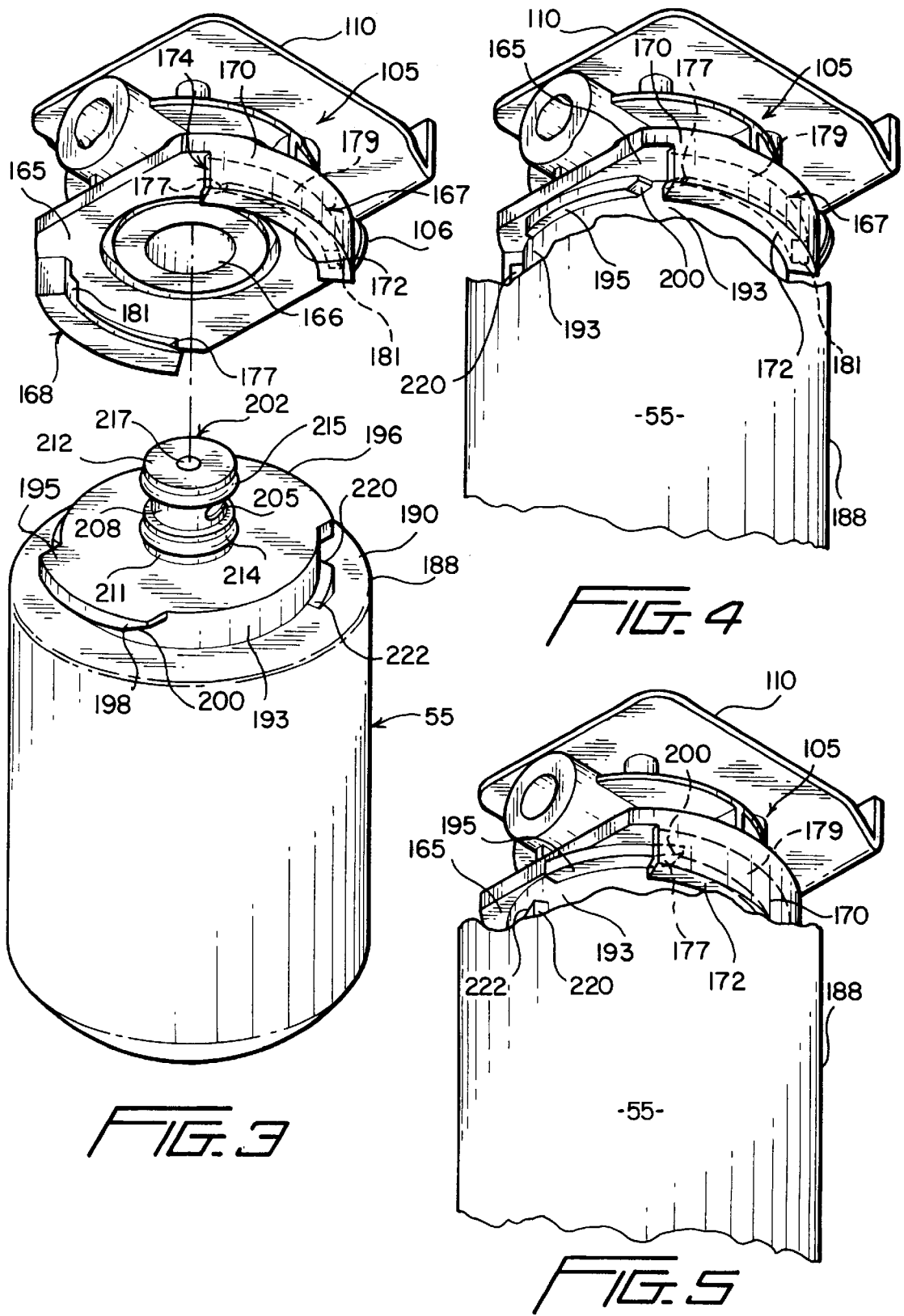

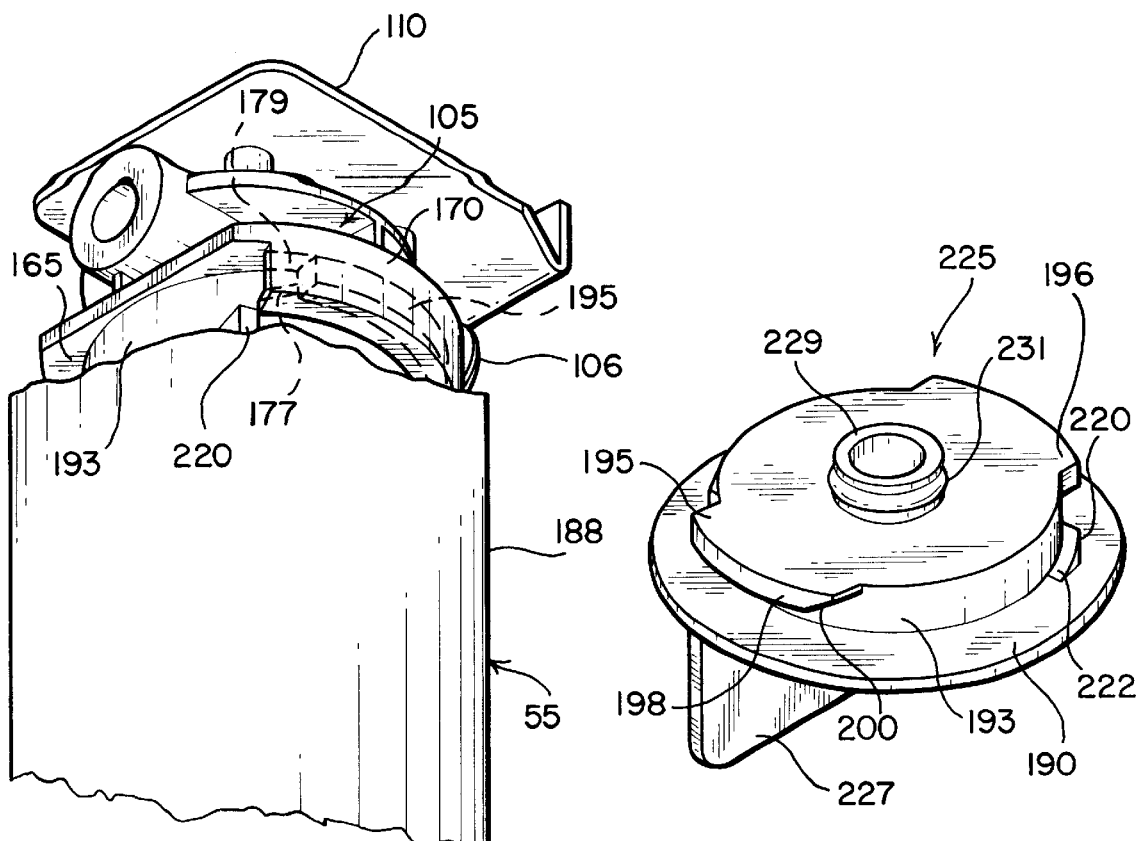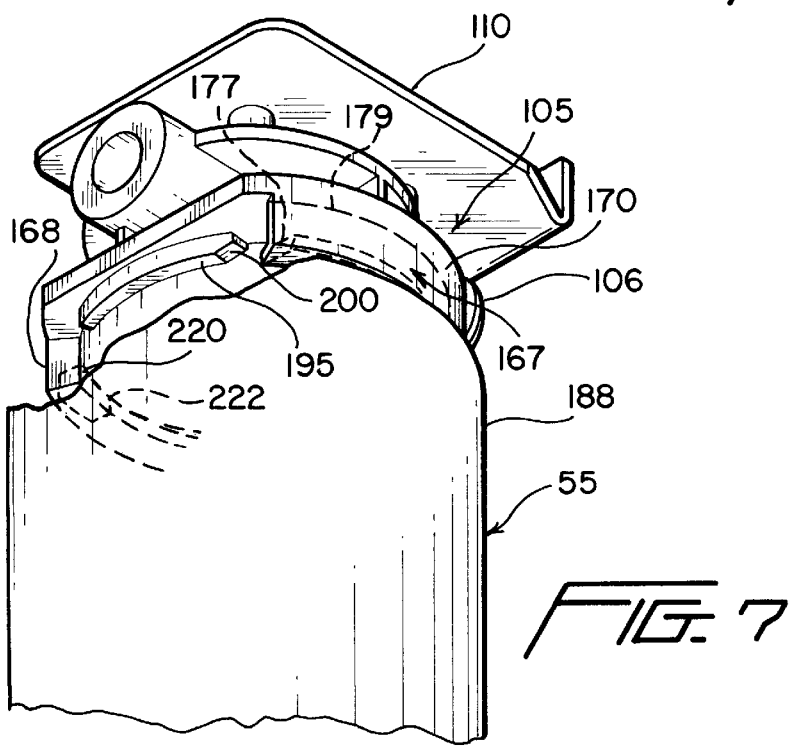

6,120,685

WATER FILTERING SYSTEM WITH REPLACEABLE CARTRIDGE FOR A REFRIGERATOR

BACKGROUND OF THE INVENTION

1. Field of the Invention

The present invention pertains to the art of water filtering systems and, more particularly, to a water filtering system incorporating a replaceable filter cartridge assembly particularly adapted for use in a refrigerator.

2. Discussion of the Invention

Providing water dispensers and automatic ice makers in household refrigerators has become extremely commonplace. In addition, there is a growing trend towards increasing the purity of all consumed water. For at least these reasons, it has heretofore been proposed in the art to incorporate a water purifying system in a refrigerator in order to filter the water supplied to a water dispenser and/or ice maker. Early proposed purifying systems of this type centered around providing a filtering unit between the water supply and the conduit entering the refrigerator. These systems were typically installed by service personnel as aftermarket add-on units. More recently, it has been proposed to incorporate filter assemblies during the overall manufacturing of refrigerators, while utilizing filters which can be fairly, readily accessed for replacement directly by consumers.

In developing an improved water filtering system, many factors need to be considered, including associated manufacturing costs, ease of use, manner of operation and reliability. Although various refrigerator water filtering assemblies are known in the art, many improvements are left to be made to simplify known filtering assemblies while increasing reliability, particularly with respect to the manner and ease in which the filter cartridges can be replaced. Based on the above, there exists a need in the art for an enhanced water filtering system, particularly a water filtering system for a refrigerator including an improved filter cartridge mounting arrangement.

SUMMARY OF THE INVENTION

The present invention is directed to a water filtering system for a refrigerator, as well as a filter cartridge useable therewith. The system is arranged to present the filter cartridge in a clearly visible and accessible location for ease of replacement by the consumer. In the preferred embodiment, the refrigerator is provided with a temperature control housing mounted in an upper rear portion of the fresh food compartment. The control housing covers a portion of a filter mounting head to which the filter cartridge is selectively secured to complete a water circuit for the system.

In accordance with a preferred embodiment of the invention, the filter cartridge includes a housing enclosing a filtering medium and a stem which projects axially from the housing for insertion into a port of the mounting head. At least one mounting lug projects radially outwardly beyond the stem, with the lug being adapted to interengage with a support element of the mounting head upon insertion of the stem into the port and at least partial rotation of the cartridge. Preferably, the lug and support element include cooperating camming surfaces which cause the stem to be drawn into the port upon initial rotation of the cartridge in a first direction. In addition, further camming surfaces are provided between the cartridge and the mounting head which causes the stem to at least partially withdraw from the port upon rotation of the cartridge in an opposite direction. In the most preferred form, the additional camming surfaces do not become interengaged until the lug is disengaged from the support element.

In accordance with another aspect of the invention, the filtering system further includes a plug which can be used in place of the filter cartridge to complete the fluid circuit through the mounting head. Preferably, the plug also incorporates multiple camming surfaces adapted to cooperate with the mounting head structure to enhance the seating and withdrawal of the plug respectively. Additional objects, features and advantages of the water filtering system of the invention will become more readily apparent from the following detailed description of a preferred embodiment, when taken in conjunction with the drawings wherein like reference numerals refer to corresponding parts in the several views.

BRIEF DESCRIPTION OF THE DRAWINGS

FIG. 3 shows a water filter cartridge incorporated in the filtering assembly of the invention in a disengaged position;

FIG. 4 shows the water filter cartridge of FIG. 3 initially attached to a filter mounting head;

FIG. 5 illustrates the water filter cartridge attached to the mounting head following partial rotation of the cartridge;

FIG. 6 illustrates the water filter cartridge in a fully attached position with the mounting head;

FIG. 7 illustrates the manner in which the water filter cartridge is disengaged from the mounting head upon rotation of the cartridge; and FIG. 8 is a perspective view of a plug which can be attached to the mounting head in place of the water filter cartridge of the invention.

DETAILED DESCRIPTION OF THE PREFERRED EMBODIMENT

Figure 1:
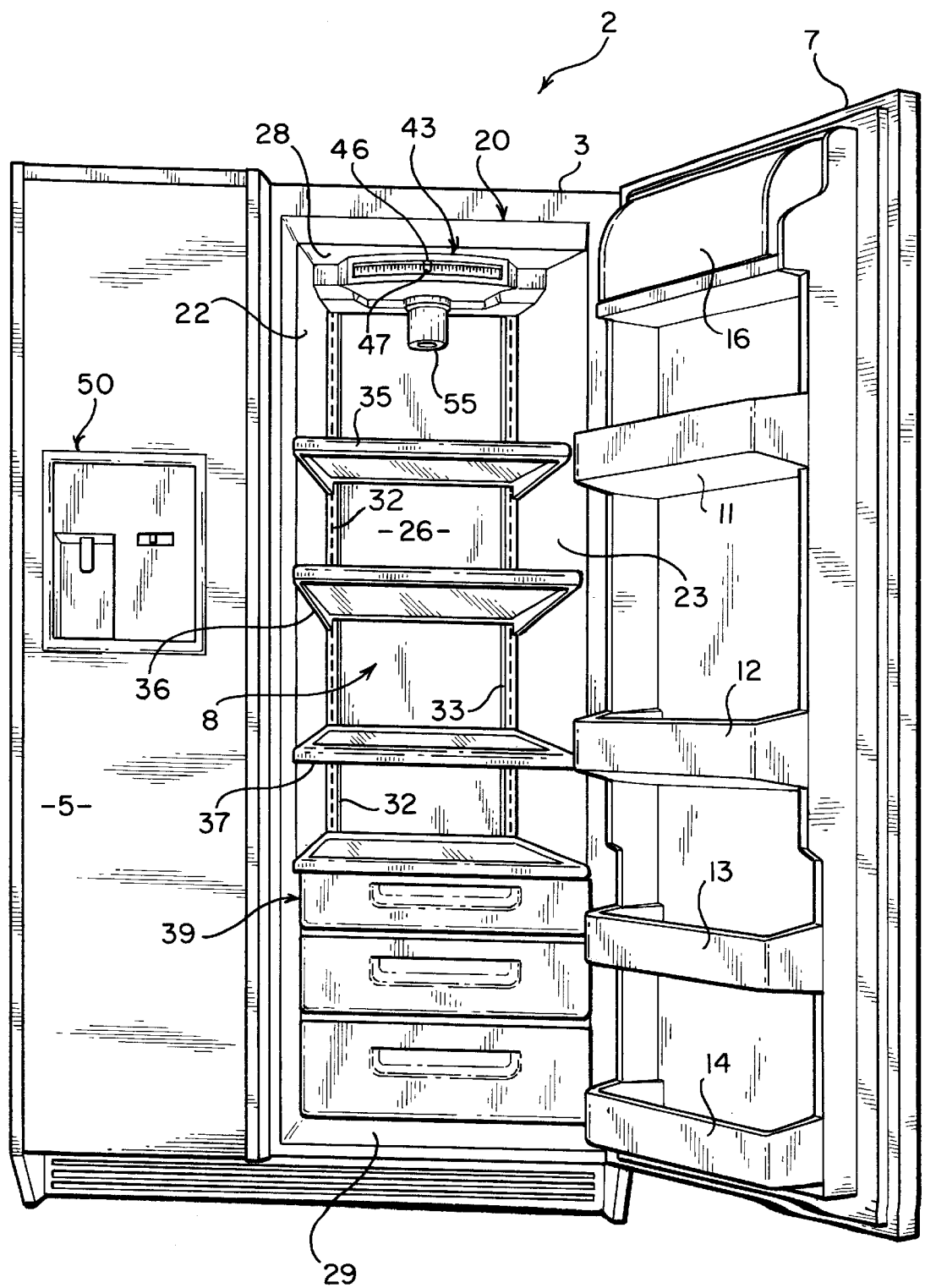
FIG. 1 is a perspective view of a side-by-side refrigerator incorporating a filtering assembly constructed in accordance with the present invention.

With initial reference to FIG. 1, a side-by-side refrigerator is generally indicated at 2. In a manner widely known in the art, a side-by-side refrigerator 2 is formed from a cabinet shell 3 to which is pivotably attached a freezer compartment side door 5 and a fresh food compartment side door 7. Side door 7 is shown open to expose a fresh food compartment 8 defined within cabinet shell 3. Fresh food compartment side door 7 supports a plurality of vertically spaced shelves 11–14 and is also preferably provided with a dairy compartment 16. In a preferred embodiment, fresh food compartment 8 is formed from an integral liner 20 having opposed side walls 22 and 23, a rear wall 26 and top and bottom walls 28 and 29. Secured to rear walls 26 by means of mechanical fasteners (not shown) are a pair of laterally spaced and vertically extending rails 32 and 33 that adjustably support various vertically spaced shelves 35–37, as well as a shelf supporting bin assembly generally indicated at 39.

Also shown mounted within fresh food compartment 8 at top wall 28 is a temperature control unit 43. Temperature control unit 43 is preferably molded of plastic and includes upper and lower slidable temperature control members 46 and 47 which can be used by a consumer to adjust the temperatures within side-by-side refrigerator 2 to preferable levels. As also shown in this figure, freezer compartment side door 5 is preferably provided with a dispensing unit 50 which can be used to selectively dispense either water or ice. In general, the above-described structure of side-by-side refrigerator 2 is known in the art and does not form part of the present invention. Instead, this description is provided for the sake of completeness. The present invention is particularly directed to the incorporation of a water filtering system for use in purifying water supplied, either directly to dispensing unit 50 or to an automatic ice maker. The present invention is also directed to a replaceable filter, generally indicated at 55 in FIG. 1, which forms part of the water filtering system of the present invention. As shown, filter cartridge 55 preferably projects downward from within the housing of temperature control unit 43 at a central rear portion of fresh food compartment 8. This location is utilized in accordance with the preferred embodiment to provide a readily visible and easily accessible filter cartridge 55 that can be replaced by a consumer as needed.

Figure 2:
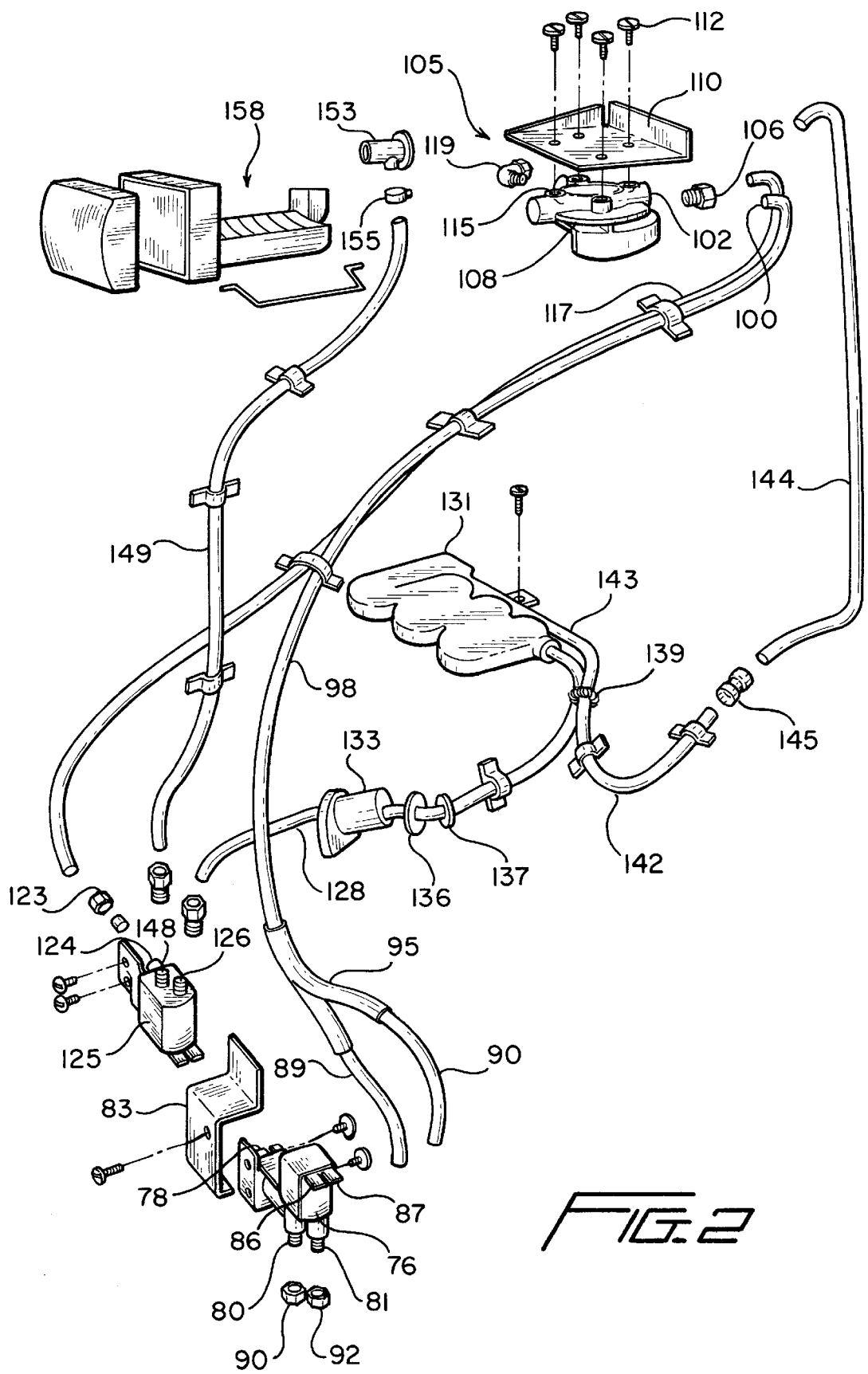
FIG. 2 is an exploded view of the filtering assembly of the invention.

Reference will now be made to FIG. 2 in detailing the overall components and their interconnections for the water filtering system of the present invention. In accordance with the preferred form of the invention, a water supply (not shown) is attached to refrigerator 2 at dual valve 76. More specifically, dual valve 76 includes an inlet 78 for attachment of the supply line, as well as first and second outlets 80 and 81. Dual valve 76 is attached to refrigerator 2 by means of bracket 83 and preferably constitutes a solenoid-type valve having electrical connectors 86 and 87 which can be utilized to fluidly interconnect inlet 78 to one or more of the first and second outlets 80 and 81 in the manner which will be described more fully below. Outlets 80 and 81 are respectively connected to first and second water delivery tubes 89 and 90, preferably through the use of compression nuts 90 and 92. First and second water delivery tubes 89 and 90 converge by means of a Y-connector 95 into a common water delivery tube 98. Tube 98 has a terminal end 100 that is connected to a water inlet 102 of a filter cartridge mounting head 105 through a connector 106.

Filter cartridge mounting head 105 is used to support filter cartridge 55 and therefore it is preferably mounted such that at least a portion of the housing of temperature control unit 43 encloses filter cartridge mounting head 105. In any event, mounting head 105 includes a main body 108 which is preferably injection molded of plastic and attached to a bracket 110 by means of various screws 112. In addition to water inlet 102, mounting head 105 has associated therewith a water outlet 115 to which is attached a tube 117 by means of an elbow connector 119. The manner in which water flows through mounting head 105 from tube 98 to tube 117 will be detailed more fully below. An opposing end of tube 117 is connected through a fitting 123 to an inlet port 124 of a dispenser valve 125. Dispenser valve 125 includes a first outlet 126 which is connected through a conduit 128 that leads to a water tank 131. In a manner known in the art, water tank 131 is preferably mounted within fresh food compartment 8, such as at lower rear portion thereof.

Since both valves 76 and 125 are preferably located outside of fresh food compartment 8, conduit 128 has positioned therealong a spacer 133 that extends through liner 20 to permit sealing around conduit 128 during the injection molding of foamed insulation within cabinet 3 in a manner widely known in the art. For additional sealing purposes, seals 136, 137 and 139 are also provided. Seal 139 is actually associated with a tube 142 that leads from water tank 131. More specifically, tube 142 includes a first section 143 that is interconnected to a second section 144 through a connector 145. Second section 144 of tube 142 directly leads to the fountain of water dispensing unit 50. Dispenser valve 125 also includes a second outlet 148 to which is attached a tube 149 that leads to a nozzle 153. More specifically, tube 149 is attached to nozzle 153 by means of a clamp 155 and nozzle 153 is utilized to provide a flow of water to an ice maker generally indicated at 158.

With this arrangement, water supplied to refrigerator 2 is first delivered to valve 76. Whether ice maker 158 or the fountain associated with dispensing unit 50 requires water will determine which side of dual valve 76 is actuated, thereby controlling the connection between the first and second water delivery tubes 89 and 90 with the flow into inlet 78. As will be discussed more fully below, mounting head 105 would normally have filter cartridge 55 attached thereto, such that water would flow into inlet 102 through common tube 98, would be forced to flow through filter cartridge 55 and would be delivered to a water outlet 115. The filtered water would then be delivered through tube 117 to dispenser valve 125 which would regulate whether the water would flow to water tank 131 and then dispenser unit 50 or to ice maker 158.

At this point, it should be realized that two valves 76 and 125 are utilized to control the flow of water in the overall water circuit. These multiple valves are utilized in order to separate the electrical nodes and allow the water to flow to its desired source. However, there are various other types of water circuit arrangements which could be devised to perform this function, such as utilizing a valve in place of dual valve 76 which has a single input and output in combination with dispenser valve 125. The disclosed embodiment is preferred since a single signal received from either the dispenser unit 50 or ice maker 158 can be used to control both valves 76 and 125 such that the water is routed in the desired path. In any case, all of the water for either the dispensing unit 50 or ice maker 158 is directed through mounting head 105 and, so long as the consumer has attached a suitable filter cartridge 55, the purity of the water delivered either to dispensing unit 50 or ice maker 158 will be enhanced.

A particular aspect of the present invention is the construction of filter cartridge 55 and the manner in which it is assembled and disassembled from mounting head 105. Reference will now be made to FIG. 3 in detailing the preferred construction of both filter cartridge 55 and mounting head 105. As shown, mounting head 105 includes a base plate 165 which is formed with a central, filter stem receiving port 166. Projecting downwardly at spaced circumferential positions from base plate 165 is a pair of arcuate support elements 167 and 168. Since the preferred construction of each of the support elements 167 and 168 is identical, the preferred construction for support element 167 will now be described in detail and it is to be understood that a corresponding structure is preferably utilized for support element 168. Support element 167 is actually defined by a substantially vertical, arcuate side wall 170 which projects downward from base plate 165, as well as a radially, inwardly projecting flange 172. With this construction, flange 172 is located in a plane below base plate 165 such that a mounting channel 174 is defined therebetween. At the entrance to mounting channel 174, flange 172 is formed with a ramp portion 177 that leads to a central portion 179 and an upstanding abutment stop 181.

On the other hand, filter cartridge 55 includes a housing 188 having an upper surface portion 190. Above surface portion 190 is provided a mounting projection 193 that includes a pair of opposed, radially outwardly extending lugs 195 and 196. In a manner analogous to support elements 167 and 168, each of lugs 195 and 196 are correspondingly constructed such that the preferred construction for a lug 195 will now be described in detail and it is to be understood that lug 196 has a corresponding construction. Lug 195 includes a leading edge 198 that is preferably chamfered or tapered at 200. Filter cartridge 55 also includes a stem 202 which projects axially above mounting projection 193. Stem 202 is provided with a pair of opposed fluid entry ports, one of which is shown at 205, formed in a reduced diametric central portion 208. Axially spaced in opposing directions from central portion 208, stem 202 includes enlarged diametric portions 211 and 212, each of which is formed with an annular groove within which is seated a respective O-ring 214, 215. As clearly shown in this figure, stem 202 is also formed with a terminal, upper port 217. Filter cartridge 55 is further preferably provided with a projection 220 that extends upward from upper surface portion 190 and radially from mounting projection 193. As clearly shown in this figure, projection 220 is provided with a sloping surface 222 which tapers in a direction substantially corresponding to that of leading edge 198. In the most preferred form of the invention, two such projections 220 are provided at circumferentially spaced positions from both each other and lugs 195 and 196.

With this construction, a consumer can manually grasp filter cartridge 55 and insert stem 202 into receiving port 166 of mounting head 105 with lugs 195 and 196 being circumferentially positioned between support elements 167 and 168. In other words, upon initial attachment of filter cartridge 55 to mounting head 105, filter cartridge 55 will be arranged relative to mounting head 105 in the manner generally illustrated in FIG. 4. In achieving this position, it should be realized that O-rings 214 and 215 create some resistance to fill insertion of stem 202 within receiving port 166. Therefore, unless filter cartridge 55 is axially forced to cause mounting projection 193 to abut base plate 165, there will likely be a certain axial gap between mounting projection 193 and base plate 165. However, upon initial rotation of filter cartridge 55 relative to mounting head 105, the leading edge 198 of each lug 195, 196 will cam with a ramp 177 of a respective support element 167, 168 which will automatically cause filter cartridge 55 to be axially drawn towards base plate 165 (see FIG. 5). In other words, upon initial rotation of filter cartridge 55 in a first direction, stem 102 will be fully drawn into receiving port 166. Thereafter, filter cartridge 55 can be continually rotated in the same direction as lugs 195 and 196 are farther received within respective mounting channels 174 until abutment stops 181 are engaged (see FIG. 6). This represents the fully seated and locked position for filter cartridge 55. In this position, water flowing into water inlet 102 of mounting head 105 will be at a location corresponding to reduced diametric central portion 208 such that the water will be caused to flow into opposed entry ports 205 of filter cartridge 55. The water will then flow into housing 188 for purification as it flows through a filtering medium and then out upper port 217. Since upper port 217 is in fluid communication with water outlet 115, the filtered water can then flow through tube 117 to dispenser valve 125.

As indicated above, O-rings 214 and 215 provide some resistance to the full insertion of stem 202 within receiving port 166. When it is desired to remove or replace filter cartridge 55, a similar resistance is also encountered. Actually, given pressures acting on at least central portion 208 within mounting head 105, even greater forces resisting removal of filter cartridge 55 can be encountered. Although these forces can be overcome by a greater axial downward force being exerted on the filter cartridge 55, such an exerted force could damage the mounting of bracket 110. However, in accordance with the present invention, the interaction between filter cartridge 55 and mounting head 105 during relative rotation advantageously assists in the removal of filter cartridge 55. More specifically, as filter cartridge 55 is moved from the fully locked position of FIG. 6, through the partially locked position of FIG. 5 and then to the position of FIG. 7, the sloping surface 222 of each projection 220 will cam with a respective support element 167, 168 to cause filter cartridge 55 to be axially shifted away from base plate 165 such that stem 202 of filter cartridge 55 automatically becomes partially withdrawn from receiving port 166 upon the simple rotation of filter cartridge 55.

Although a preferred embodiment for the structure and mounting of filter cartridge 55 has been described, it should be recognized that there are various other types of camming arrangements which could be readily utilized to enhance the axial shifting of filter cartridge 55 relative to mounting head 105 upon rotating of filter cartridge 55. For instance, although lugs 195 and 196, as well as projections 220, are preferably provided on filter cartridge 55 and support elements 167 and 168 are formed as part of mounting head 105, the position of these elements are interchangeable and could be readily reversed. At this point, it is simply important to note the ability of the mounting arrangement to provide for the axial shifting of filter cartridge 55 relative to mounting head 105 upon rotation of filter cartridge 55 in either direction. This axial shifting is particularly advantageous during the removal of filter cartridge 55 and is considered to represent a significant advantage over the known prior art.

Based on the above description, it should also be realized that mounting head 105 does not incorporate any complicated internal valving structure that would need to be activated upon positioning of stem 202 within receiving port 166. Therefore, with this system, it would be possible for water to flow out of receiving port 166 of mounting head 105 if doors 5 and 7 of refrigerator 2 were closed and dispenser unit 50 and/or ice maker 158 signal the need for water in the absence of filter cartridge 55. In case another filter cartridge 55 is not readily available for replacement purposes, the overall filtering system of the present invention also contemplates the utilization of a plug such as that shown at 225 in FIG. 8. In general, plug 225 is adapted to be mounted to head 105 in a manner directly analogous to that described above with respect to filter cartridge 55 and therefore includes corresponding mounting structure. For at least these reasons, common reference numerals have been utilized in FIG. 8 and the reiteration of this structure will not be presented here. However, it should be noted that plug 225 is provided with an elongated tab 227 which can be grasped by a user for mounting of plug 225 to mounting head 105. In addition, since plug 225 is only intended to close off receiving port 166 and not to divide any flow path between water inlet 102 and water outlet 115, plug 225 includes a stem 229 which is actually shorter than stem 202 and which incorporates a single O-ring 231. More importantly, plug 225 includes corresponding lug and projection structure such that the axial shifting of stem 229 into and out of receiving port 166 upon rotation of plug 225 is performed in a manner directly corresponding to that described above with respect to filter cartridge 55.

Based on the above, it should be readily apparent that various changes and/or modifications can be made to the present invention without departing from the spirit thereof. For instance, although described with reference to use in a side-by-side refrigerator, the filtering system and cartridge of the invention could be used in various environments, as well as different style refrigerators. In any event, the invention is only intended to be limited by the scope of the following claims.

We claim:

1. In a refrigerator incorporating a system for filtering water delivered to at least one of a water dispenser and an ice maker, a water filter assembly comprising:

a mounting head having a water inlet adapted to be connected to a fresh water supply, a water outlet connected to at least one of a water dispenser and an ice maker, a filter stem receiving port fluidly interposed between the water inlet and the water outlet, and at least one support element; and a water filter cartridge adapted to be replaceably attached to the mounting head to fluidly interconnect the water inlet and water outlet, said water filter cartridge including: a housing for enclosing a filtering medium with said housing having an upper surface portion; a stem projecting axially away from the upper surface portion, said stem being adapted to be inserted into the port of the mounting head and being provided with at least one O-ring, at a position spaced from the upper surface portion of the housing, for creating a seal between the stem and the port; at least one mounting lug projecting radially outwardly beyond the stem, with the mounting lug being interengaged with the support element of the mounting head upon insertion of the stem in the port and at least partially rotating the housing relative to the mounting head; a first cam element adapted to interengage with the mounting head to draw the stem within the port upon rotation of the housing relative to the mounting head in a first direction; and a second cam element adapted to interengage with the mounting head to withdraw the stem from within the port upon rotation of the housing relative to the mounting head in a second direction.

2. The water filter assembly according to claim 1, wherein the second cam element is located physically closer to the upper surface of the housing than the first cam element.

3. The water filter assembly according to claim 2, wherein the second cam element projects directly from the upper surface portion.

4. The water filter assembly according to claim 1, wherein the first cam element is circumferentially offset relative to the second cam element.

5. The water filter assembly according to claim 4, wherein each of the first and second cam elements includes a sloping surface portion, with the sloping surface portions of the first and second cam elements tapering in a common direction.

6. The water filter assembly according to claim 1, wherein the second cam element is positioned relative to the at least one mounting lug such that the second cam element is adapted to engage the mounting head following disengagement of the mounting lug with the support element.

7. The water filter assembly according to claim 1, wherein the first cam element is formed at an end section of the at least one mounting lug.

8. The water filter assembly according to claim 1, further comprising:

a plug, having an associated stem and mounting lug, adapted to be selectively attached to the mounting head in place of the filter cartridge.

9. The water filter assembly according to claim 1, wherein the refrigerator includes a fresh food compartment within which is mounted a temperature control housing, said temperature control housing covering at least a portion of the mounting head while the filter cartridge is visually exposed below the temperature control housing.

10. A water filter cartridge for replaceable attachment to a mounting head of a water filtering system comprising:

a housing for enclosing a filtering medium, said housing including an upper surface portion;

a stem projecting axially away from the upper surface portion, said stem being adapted to be inserted into a port of the mounting head through which water flows to be purified, said stem being provided with at least one O-ring, at a position spaced from the upper surface portion, for creating a seal between the stem and mounting head;

at least one mounting lug projecting radially outwardly beyond the stem, said at least one mounting lug being adapted to interengage with a support element of the mounting head upon insertion of the stem in the port and at least partial rotation of the housing relative to the mounting head;

a first cam element adapted to interengage with the mounting head to draw the stem within the port upon rotation of the housing relative to the mounting head in a first direction; and a second cam element adapted to interengage with the mounting head to withdraw the stem from within the port upon rotation of the housing relative to the mounting head in a second direction.

11. The water filter cartridge according to claim 10, wherein the second cam element is located physically closer to the upper surface of the housing than the first cam element.

12. The water filter cartridge according to claim 11, wherein the second cam element projects directly from the upper surface portion.

13. The water filter cartridge according to claim 10, wherein the first cam element is circumferentially offset relative to the second cam element.

14. The water filter cartridge according to claim 13, wherein each of the first and second cam elements includes a sloping surface portion, with the sloping surface portions of the first and second cam elements tapering in a common direction.

15. The water filter cartridge according to claim 10, wherein the second cam element is positioned relative to the at least one mounting lug such that the second cam element is adapted to engage the mounting head following disengagement of the mounting lug with the support element.

16. The water filter cartridge according to claim 10, wherein the first cam element is formed at an end section of the at least one mounting lug.

17. A method of replacing a filter cartridge of a refrigerator water filtering system comprising:

manually rotating the filter cartridge relative to a mounting head of the water filtering system to cause a mounting lug of the filter cartridge to become disengaged from a support element on the mounting head;

continuing to rotate the filter cartridge while a camming action between the filter cartridge and the mounting head causes the filter cartridge to be axially shifted relative to the mounting head and a stem portion of the filter cartridge to become at least partially withdrawn from within a filter port formed in the mounting head;

axially removing the filter cartridge from the mounting head;

positioning a new filter cartridge with an axial stem portion projecting into the filter port of the mounting head; and rotating the new filter cartridge to interengage a mounting lug thereof with the support element of the mounting head.

18. The method according to claim 17, further comprising: axially drawing the stem portion of the new filter cartridge into the filter port during rotation of the new filter cartridge through a camming action between the filter cartridge and the mounting head.

19. The method according to claim 17, further comprising: causing the filter cartridge to axially shift relative to the mounting head through the camming action only following complete disengagement between the mounting lug and the support element.

20. The method according to claim 17, further comprising: selectively connecting a plug to the mounting head in place of a filter cartridge.

* * * * *